Patented Nov. 21, 1922.

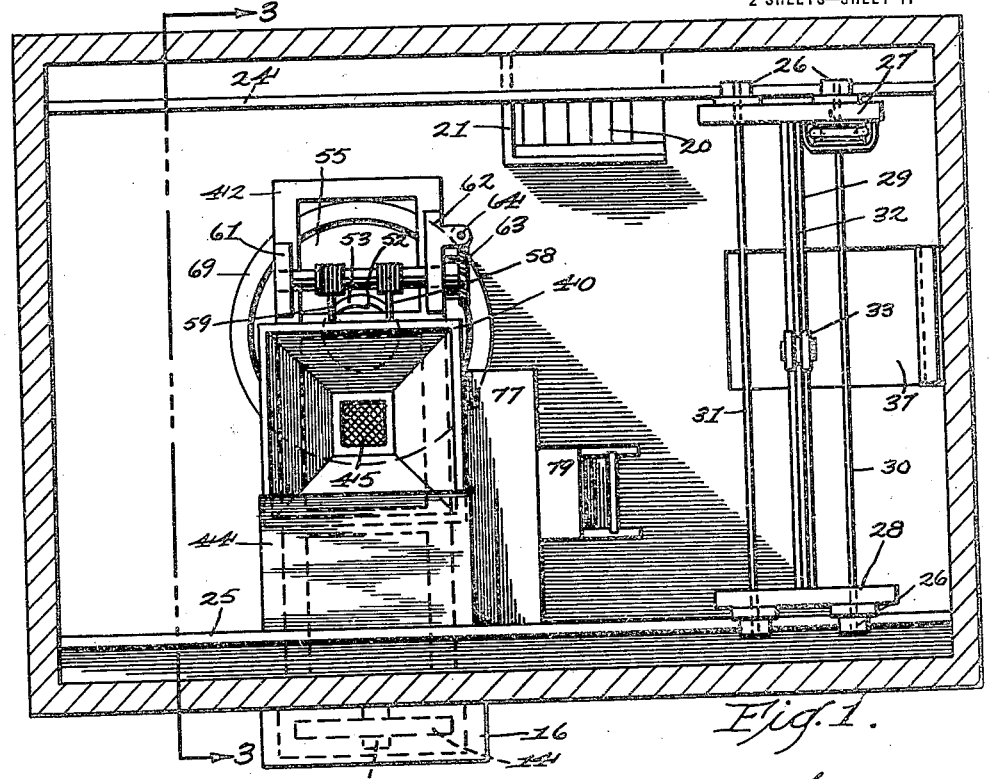
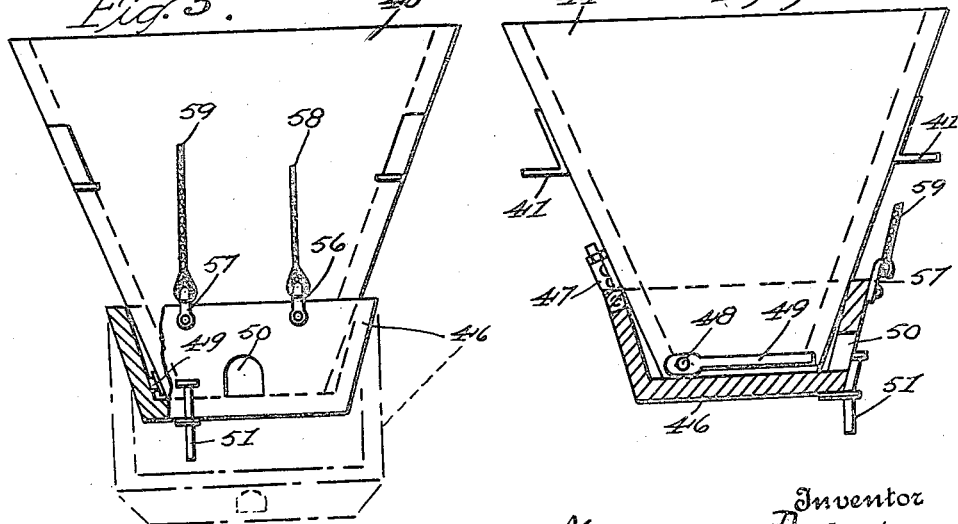

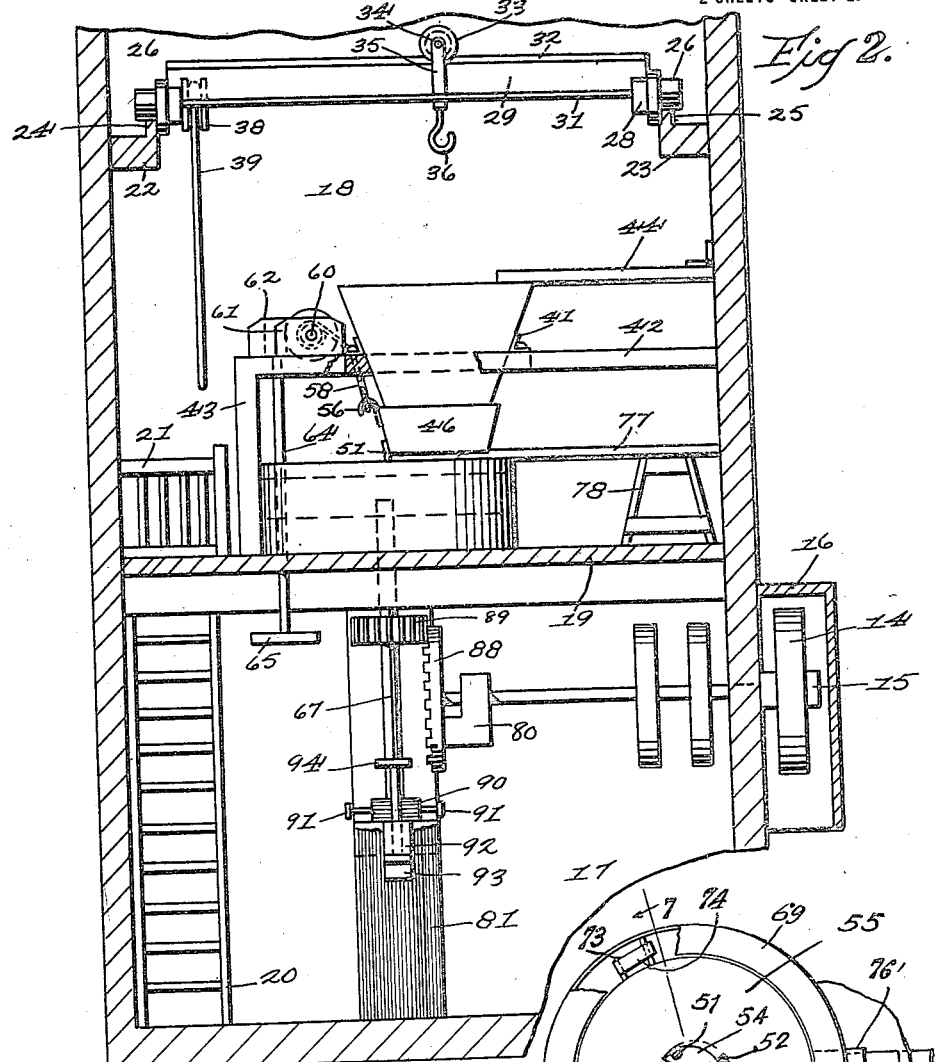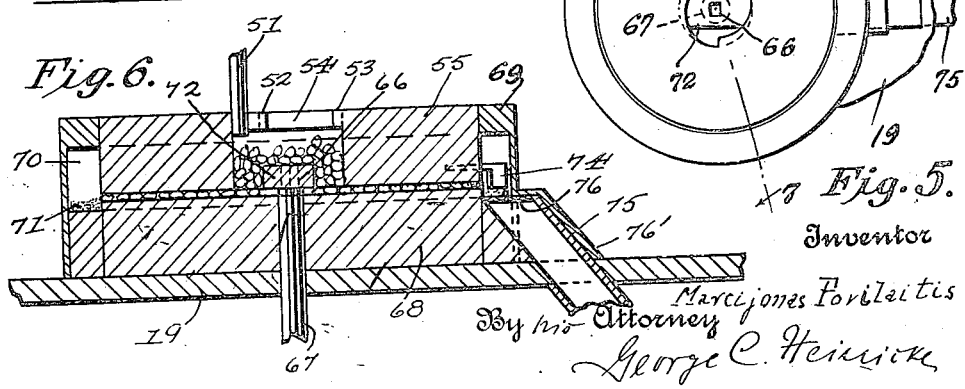

1,436,404

UNITED STATES PATENT OFFICE.

MARCIJONAS POVILAITIS, OF CHICAGO, ILLINOIS.

GRAIN MILL.

Application filed July 27, 1921. Serial No. 487,934.

*To all whom it may concern:*

Be it known that I, MARCIJONAS POVILAITIS, a citizen of Lithuania, residing at Chicago, county of Cook, and State of Illinois, have invented certain new and useful Improvements in Grain Mills, of which the following is a specification.

This invention has for its object, improvements in grain or flour mills, and it is the principal object of the invention to construct such a mill for the use of farmers which can be easily and cheaply constructed and which is extremely serviceable for grinding grains, and other similar material to be reduced to a pulverized condition.

Another object of the invention is to provide a mill of this character so arranged as to enable the ready removal and replacement of parts and facilitating the making of repairs.

A further object of the invention is the provision of a mill allowing the ready regulation of the grinding process so that the material may be reduced or comminuted to a coarser or finer grade, as desired.

A still further object of the invention is the provision of a mill in which the ground material is swept into a chute which is provided with a sieve for sifting the ground material before it is packed into the sacks, etc.

Another important object of this invention is to provide a mill of the above mentioned type which allows the regulation of the shaking operation of the feed hopper and a stopping of the flow of grain to the millstones if desired.

Other objects and advantages of the invention will become apparent in connection with the following description and the accompanying drawings forming a material part of this disclosure, and in which:

Figure 1 is a top plan view of a mill embodying my invention after removal of the roof.

Figure 2 is a transverse section through the mill on line 3—3 of Figure 1.

Figure 3 is a detail front view of the hoppre, and co-operating parts, partly in section.

Figure 4 is a view similar to Figure 3 showing a side elevation of the hopper and co-operating parts, partly in section.

Figure 5 is a top plan view of the millstone arrangement, and

Figure 6 is a section through the same, on line 7—7 of Figure 5.

The mill is erected with a house 10 having gable roof 11, windows 12 and a door 13.

A pulley 14 is provided on a shaft and encased in a housing 16; this pulley can be driven by means of a belt from any suitable motor in the well known manner.

The house 10 has preferably two floors, a ground floor 17 and an upper floor 18 separated by a ceiling 19 and a stair 20 leads from the ground floor 17 to the upper floor 18 through an opening in the ceiling surrounded by a railing 21.

Brackets 22 and 23 are secured to the side walls of the upper floor spaced from its ceiling and constitute rails 24 and 25 on which the wheels 26 of carriages 27 and 28 run which are connected by a transverse central beam 29 and side bars 30 and 31. On the upper edge of this beam 29 a rail 32 is supported over which a grooved wheel 33 runs from the axle 34 of which a forked frame 35 is suspended carrying at its lower end a hook 36 for the attachment of a block and tackle for lifting the grain bags onto the hook through an opening 37 in the ceiling 19.

One of the bars 30 carries a pulley 38 over which a chain 39 is guided by means of which the carriages and beam 29 can be moved across the upper floor in order to bring it over a hopper 40 into which the grain sacks suspended from hook 36 are to be emptied.

This hopper is provided with brackets 41 on its outer side walls intermediate its ends by means of which it is secured between the beams 42 of a frame secured with one end to the side wall of the housing and resting with their other ends on a supporting frame 43. A platform 44 is hingedly connected to the side wall of the housing above the beams 42 and is of a size allowing its front edge to rest on the top edge of the hopper.

The bottom end of the hopper 40 is closed by a sieve 45 and a shaker box or trough 46 is hingedly secured on one side, as indicated at 47, to one of the outer walls of the hopper near the bottom thereof. Near the bottom of the hopper, one of its outer walls has secured thereto by means of a pin 48 a leaf spring 49, while the front wall of the box 46 has an opening 50 through which the grain is fed to the millstones.

A substantially vertical shaker pin 51 is attached to the front wall of the box 46 and is adapted to engage successively a plurality of shoulders 52 of a metal ring 53 lining the center opening 54 of the upper millstone 55.

To the upper edge of the box 46 at the side of the opening 50, two hooks 56 and 57 are attached to which are fastened the ends of cables 58 and 59, the other ends of which are wound upon a shaft 60 journalled in bearings 61 and 62 on frame 42 and having one of its ends extended beyond the bearing 62 where it carries a worm wheel 63 in mesh with a worm at the upper end of a vertical rod 64 extending to the lower floor 17 where it is provided with an operating handle 65. By the operation of this handle the box 46 can be closed against the lower mouth of the hopper and withdrawn therefrom by the intermediary of the cables, in order to regulate the amount of grain fed to the millstones.

The upper millstone 55 is rotatably mounted on a head 66 of a vertical shaft 67 passing through the lower stationary millstone 68, which is surrounded by a flange on which rests the lower edge of a collar or ring 69 surrounding the upper stone 55 and leaving a space 70 between stone and collar in which the grain flour 71 accumulates after the grain 72 has been fed between the stones as indicated in Figure 7 and crushed therebetween.

A pin 73 is projecting from the side of the movable stone 55 and carries a scraper or sweeper 74 by means of which the flour accumulating in the space 70 on top of the flange of the lower stone 68 is swept into an inclined chute 75 extending from space 70 through the ceiling 19 to the lower floor 17, and the upper mouth of the chute is closed by a wire netting 76, while an angle plate 76' bent outwardly of the material of collar 69 is holding the upper end of the chute.

A platform 77 is erected on trestles 78 by the side of the hopper for the miller and can be reached by means of chain 79.

The horizontally disposed shaft 15 of the pulley 14 is extended into the house and is supported on the lower floor 17 thereof in a bearing 80 secured to a vertical beam 87, and carries at its inner end a cam wheel 88 in mesh with a gear 89 on shaft 67. The lower end of the shaft 67 is rotating in a square bearing 90 in which it is held by screws 91. This bearing 90 is resting on a beam 92 rotatably secured at one end between two beams which are provided on the lower floor parallel to and, in alignment with beam 89, while its front end is resting on a bracket 93, and a set screw 94 is passed through the upper edge of the beam and through the same in engagement with the upper face of the bracket 93 so that the shaft 67 and the movable stone may be raised or lowered in order to increase or decrease the distance between the stones and thus obtain a finer or coarser flour, as desired. By the proper manipulation of the screw 91, the shaft 67 will always be kept in a straight vertical line.

It is to be understood that the general arrangement of the parts of my invention herewith shown and described is to be taken as a preferred example of the same, and that certain changes in the shape, size and construction of the minor details may be resorted to without departing from the spirit and scope of my invention.

What I claim and desire to secure by Letters Patent of the United States, is:—

In a mill of the class described, the combination of a rotary millstone having a central opening, with a hopper removably held above said millstone, a box hingedly secured at one side to the lower end of said hopper, a leaf spring secured at one end to the lower part of said hopper, a door on said box, a shouldered ring in the central opening of said millstone, a pin on said box adapted to successively engage the shoulders of said ring, a pair of hooks secured to said box and means connected with said hooks for closing said box against said hopper.

In testimony whereof I have affixed my signature.

MARCIJONAS POVILAITIS.